United States Patent
Umrao et al.

(10) Patent No.: US 11,170,362 B2
(45) Date of Patent: Nov. 9, 2021

(54) METHODS, SYSTEMS, AND NETWORKS FOR AUTHENTICATION BASED ON PHYSICAL CONDITION OF A MOBILE DEVICE

(71) Applicant: Mastercard International Incorporated, Purchase, NY (US)

(72) Inventors: Archit Umrao, Farrukhabad (IN); Shubham Kumar, Gurugram (IN); Shubhangi Sengar, Garha (IN); Rahul Lamba, Noida (IN); Anurag Aggarwal, Model Town (IN); Aditya Koduri, Gurgaon (IN); Deepak Agarwal, Gurugram (IN); Rajesh Chopra, Gurugram (IN)

(73) Assignee: Mastercard International Incorporated, Purchase, NY (US)

( * ) Notice: Subject to any disclaimer, the term of this patent is extended or adjusted under 35 U.S.C. 154(b) by 141 days.

(21) Appl. No.: 16/514,611

(22) Filed: Jul. 17, 2019

(65) Prior Publication Data
US 2021/0019736 A1 Jan. 21, 2021

(51) Int. Cl.
*G06Q 20/34* (2012.01)
*G06Q 20/40* (2012.01)
(Continued)

(52) U.S. Cl.
CPC .......... *G06Q 20/354* (2013.01); *G06F 16/50* (2019.01); *G06K 9/00671* (2013.01);
(Continued)

(58) Field of Classification Search
CPC ............ G06Q 20/354; G06Q 20/3227; G06Q 20/4016; G07F 19/207; G06F 16/50; G06F 19/207; G06K 9/00671; G06T 7/0002
See application file for complete search history.

(56) References Cited

U.S. PATENT DOCUMENTS 8,497,983 B2 7/2013 Cowburn et al.
9,779,452 B1 10/2017 Medina et al.
(Continued)

FOREIGN PATENT DOCUMENTS

WO WO 2018/164684 A1 9/2018

OTHER PUBLICATIONS

International Search Report and Written Opinion dated Aug. 27, 2020 in International Application No. PCT/US2020/037387.
(Continued)

*Primary Examiner* — Bennett M Sigmond
*Assistant Examiner* — Marla Hudson
(74) *Attorney, Agent, or Firm* — Baker Botts L.L.P.

(57) ABSTRACT

The disclosed subject matter includes methods, systems, and networks for authentication based on physical characteristics of a mobile device. A computer-implemented method performed by a payment network includes receiving an image of a part of a mobile device from an image capturing device that communicates with the payment network, wherein the mobile device includes digital card data of a customer. The computer-implemented method may also include comparing a physical condition of the part of the mobile device shown in the received image to the physical condition of the part of the mobile device shown in a stored image. In addition, the computer-implemented method may include authenticating or declining a transaction involving the digital card data based on the comparison of the physical condition of the part of the mobile device in the received image and the stored.

20 Claims, 6 Drawing Sheets

(51) Int. Cl.
*G06K 9/00* (2006.01)
*G06Q 20/32* (2012.01)
*G06F 16/50* (2019.01)
*G06T 7/00* (2017.01)

(52) U.S. Cl.
CPC ..... *G06Q 20/3227* (2013.01); *G06Q 20/4016* (2013.01); *G06T 7/0002* (2013.01)

(56) References Cited

U.S. PATENT DOCUMENTS

| | | |
|---|---|---|
| 2012/0310756 A1 | 12/2012 | Agashe et al. |
| 2013/0062405 A1 | 3/2013 | Ma et al. |
| 2014/0052636 A1 | 2/2014 | Mattes |
| 2014/0067679 A1 | 3/2014 | O'Reilly et al. |
| 2014/0279516 A1* | 9/2014 | Rellas ............... G06Q 20/4012 705/44 |
| 2015/0134552 A1 | 5/2015 | Engels et al. |
| 2015/0256713 A1 | 9/2015 | Booth et al. |
| 2015/0348019 A1 | 12/2015 | Faith et al. |
| 2016/0042346 A1 | 2/2016 | Pastore et al. |
| 2016/0275460 A1* | 9/2016 | Ploetner ................. G07F 7/06 |
| 2017/0323279 A1* | 11/2017 | Dion ................. G06Q 30/0279 |
| 2018/0089688 A1 | 3/2018 | Kohli |
| 2018/0150844 A1* | 5/2018 | Dolan ............. G06Q 20/40145 |
| 2019/0147156 A1 | 5/2019 | Burri et al. |
| 2019/0388182 A1 | 12/2019 | Kumar et al. |
| 2020/0151719 A1 | 5/2020 | Sarin |

OTHER PUBLICATIONS

International Search Report and Written Opinion dated Nov. 26, 2020 in International Application No. PCT/US2020/037386.
U.S. Appl. No. 16/514,519 (US2021/0019750), filed Jul. 17, 2019 (Jan. 21, 2021).
U.S. Appl. No. 16/514,519, filed Mar. 19, 2021 Non-Final Office Action.

* cited by examiner

METHODS, SYSTEMS, AND NETWORKS FOR AUTHENTICATION BASED ON PHYSICAL CONDITION OF A MOBILE DEVICE

BACKGROUND

The disclosed subject matter relates to methods, systems, and networks for authentication based on physical characteristics of a payment card, such as physical wear and tear of the payment card. A payment card, for example, may be a credit card or a debit card. In addition, the disclosed subject matter relates to methods, systems, and networks of authentication based on the physical condition of a mobile device that includes the digital card data.

Payment cards have become a ubiquitous tool used by consumers for purchasing products and services. Given the increased number of payment cards worldwide, the risk of fraudulent activity has proportionally increased. While some payment card fraud merely involves stealing card information, such as a credit card number, expiration date, or a card verification value (CVV), other fraud can involve the added step of using the stolen information to create a fake or duplicate payment card.

Credit card monitoring has become increasingly effective at detecting fraudulent transactions. Most of the monitoring, however, has focused on identifying inconsistencies between a monitored transaction and regular transactions using the payment card. For example, if most of the transactions authorized by a payment card occur in a first country, and a purchase using the payment card is detected in a second country, the purchase may be flagged as a potential fraudulent transaction. In another example, when a transaction is detected that is ten times higher than the average transaction amount, the specific transaction may be flagged and declined as fraudulent. Despite this monitoring, credit card fraud is a continuously evolving challenge that needs to be addressed.

Beyond payment cards, the use of mobile devices or phones as contactless payment devices are on the rise. Mobile devices or phones that are used for contactless payment generally include payment card information of a user or customer in digital form, which can be referred to as digital card data. While use of mobile devices or phones provide a convenient payment option for users, they also present an increased opportunity for fraudulent activity. Digital card data, for example, can be stolen from consumers or obtained as part of a data leak. The digital card data can then be easily embedded into a new mobile device and used for fraudulent transactions.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, an apparatus in a payment network includes at least one memory comprising computer program code, and at least one processor. In certain embodiments, the computer program code is configured, when executed by the at least one processor, to cause the apparatus in the payment network to receive an image of a part of a mobile device from an image capturing device that communicates with the payment network, where the mobile device includes digital card data of a customer, and compare a physical condition of the part of the mobile device shown in the received image to the physical condition of the part of the mobile device shown in a stored image. The computer program code is also configured, when executed by the at least one processor, to cause the apparatus in the payment network to authenticate or decline a transaction involving the digital card data based on the comparison of the physical condition of the part of the mobile device in the received image and the stored image.

For purpose of illustration and not limitation, the image capturing device is included in a point-of-sale (POS) terminal.

For purpose of illustration and not limitation, the computer program code is configured, when executed by the at least one processor, to cause the apparatus to use an additional layer of authentication to authenticate or decline the transaction involving the digital card data. The additional layer of authentication comprises a one-time password or an international mobile equipment identity.

For purpose of illustration and not limitation, the received image illustrates an incremental change to the physical condition of the part of the mobile device compared to the part shown in the stored image.

For purpose of illustration and not limitation, the received image of the part of the mobile device has been encoded using a coding algorithm.

For purpose of illustration and not limitation, the computer program code is configured, when executed by the at least one processor, to cause the apparatus to store the received image of the part of the mobile device in a database.

For purpose of illustration and not limitation, the computer program code is configured, when executed by the at least one processor, to cause the apparatus to replace the stored image of the part of the mobile device with the received image of the part of the mobile device.

For purpose of illustration and not limitation, the computer program code is configured, when executed by the at least one processor, to cause the apparatus to identify the customer of the mobile device based on the digital card data or an international mobile equipment identity associated with the received image of the part of the mobile device.

For purpose of illustration and not limitation, the computer program code is configured, when executed by the at least one processor, to cause the apparatus to send an alert to a customer when the transaction is declined, where the alert informs the customer of fraudulent use of the digital card data.

For purpose of illustration and not limitation, the computer program code is configured, when executed by the at least one processor, to cause the apparatus to send another alert to a third party when the transaction is declined, where the another alert comprises an international mobile equipment identity of the mobile device.

For purpose of illustration and not limitation, the transaction involving the digital card data is declined when the physical condition of the part of the mobile device in the received image differs by a threshold from the physical condition of the part of the mobile device in the stored image.

For purpose of illustration and not limitation, the transaction is authenticated when the physical condition of the part of the mobile device in the received image matches the physical condition of the part of the mobile device in the stored image by a threshold.

For purpose of illustration and not limitation, the part of the mobile device comprises a front, a back, a side, or an edge of the mobile device.

For purpose of illustration and not limitation, the image capture device comprises at least one of a camera or a scanner.

An example of a computer-implement method performed by a payment network can include receiving an image of a part of a mobile device from an image capturing device that communicates with the payment network. The mobile device can include digital card data of a user. The method can also include comparing a physical condition of the part of the mobile device shown in the received image to the physical condition of the part of the mobile device shown in a stored image. In addition, the method can include authenticating or declining a transaction involving the digital card data based on the comparison of the physical condition of the part of the mobile device in the received image and the stored image.

According to certain embodiments a non-transitory computer-readable medium encoding instructions that, when executed in hardware of a payment network, perform a process. The process can include receiving an image of a part of a mobile device from an image capturing device that communicates with the payment network. The mobile device can include digital card data of a user. The process can also include comparing a physical condition of the part of the mobile device shown in the received image to the physical condition of the part of the mobile device shown in a stored image. In addition, the process can include authenticating or declining a transaction involving the digital card data based on the comparison of the physical condition of the part of the mobile device in the received image and the stored image.

An apparatus, in certain embodiments, can include a computer program product encoding instructions for performing a process in a payment network according to a method. The method includes receiving an image of a part of a mobile device from an image capturing device that communicates with the payment network. The mobile device can include digital card data of a user. The method can also include comparing a physical condition of the part of the mobile device shown in the received image to the physical condition of the part of the mobile device shown in a stored image. In addition, the method can include authenticating or declining a transaction involving the digital card data based on the comparison of the physical condition of the part of the mobile device in the received image and the stored image.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

Throughout the drawings, the same reference numerals and characters, unless otherwise stated, are used to denote like features, elements, components or portions of the illustrated embodiments. Moreover, while the present disclosed subject matter will now be described in detail with reference to the figures, it is done so in connection with the illustrative embodiments.

DETAILED DESCRIPTION

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

Certain embodiments can help to prevent card fraud by taking advantage of the physical characteristics of a payment card. Each payment card develops unique characteristics as part of the normal wear and tear of using and storing the card. Physical characteristics, such as smudges, scratches, stains, marks, or blotches, may develop on the card, and may be difficult to replicate. Taking advantage of these physical characteristics or physical condition can help to prevent or stop fraudulent transactions by a cloned card.

Other embodiments can help to prevent fraudulent users from using replicated digital card data to make a payment. Despite the increased use of mobile devices for making payments, many embodiments still rely on a one-time password and/or an international mobile equipment identity (IMEI). In embodiments that rely on IMEI, when a customer initiates a transaction the unique IMEI of the mobile device will be identified. If the IMEI is recognized, either through previous use or registration, the transaction will be authorized. In embodiments that rely on a one-time password, when a customer initiates a transaction they receive a message with one-time password. The message, for example, can be sent to the mobile device of the customer via a short message service or electronic mail. Before the transaction is approved, the customer is required to input the received one-time password and verify the transaction.

Strictly relying on one-time password and IMEI verification can provide insufficient protection at times. For example, one-time passwords can be maliciously retrieved using phishing applications installed into a customer mobile device. These phishing applications forward the generated one-time password to hackers, which can then use the generated one-time password to authorize a fraudulent transaction. A similar concern exists with IMEI verification. While IMEI is unique to each mobile device, hackers may steal the fixed number and spoof or replicate the IMEI number in a different device. Once spoofed or replication, the different device can be used to circumvent the IMEI verification. This fraudulent behavior can continue until the cardholder reports the fraud to the card issuer. Certain embodiments described below, therefore, provide for authentication or verification of transactions that involve digital card data using the physical condition of the mobile device or phone.

The physical condition, for example, can be one or more scratches, smudges, warping, and/or lines on any surface of the mobile device or phone. The physical condition can also be one or more bumps, punctures, dents, and/or any other physical mark on or below any of the surfaces of the mobile device or phone. In some embodiments the physical condition of the mobile device can not visible to the human eye, even though they can be detected by a camera or sensor located on the POS terminal.

In another embodiment, the physical condition may include moisture under the screen display and/or liquid damage experienced by the mobile device or phone. Moisture under the screen can be observed by bubbled formed under the screen or under the screen protector. Liquid damage, on the other hand, can be detected by looking at one or more pixel deformities. Physical condition may also include corrosion, discoloration, or fuzzy growth on the charging port, headset port, memory por, and/or any other port located on the mobile device. In yet another embodiment, the physical condition may be wallpaper, casing, screen protector, or any other cover placed on one or more surfaces of the mobile device or phone.

Figure 1:
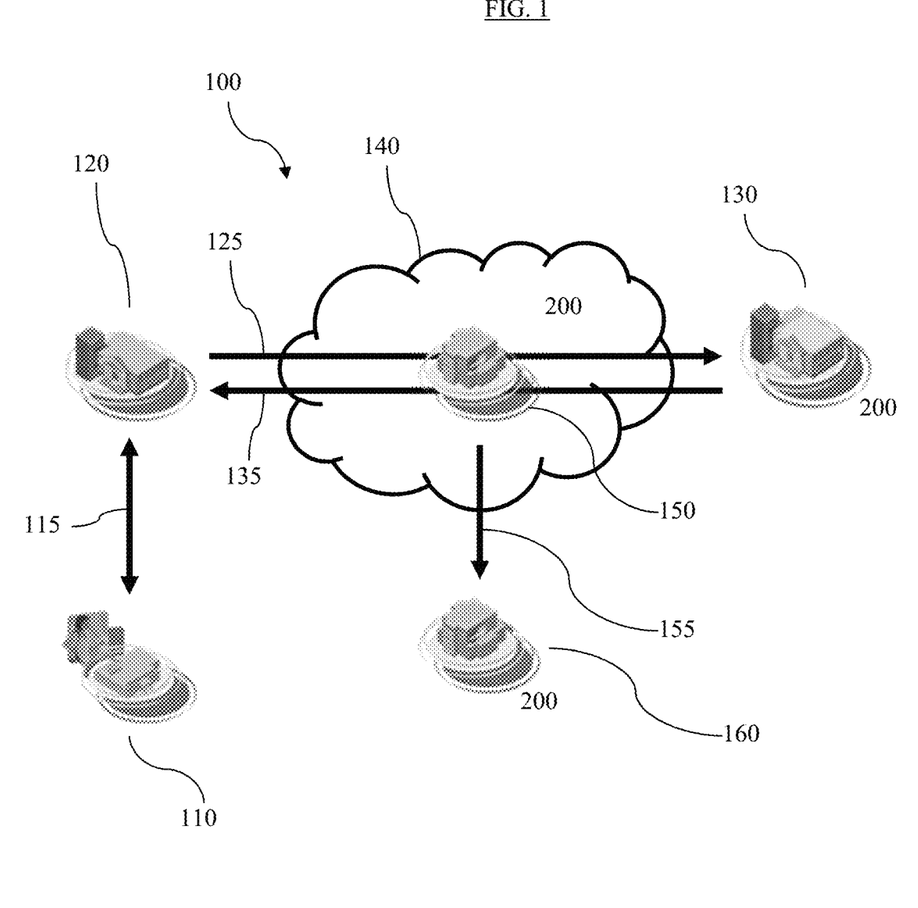
FIG. 1 is a diagram illustrating a representative payment network according to an illustrative embodiment of the disclosed subject matter.

FIG. 1 depicts a diagram illustrating a representative payment network 100 according to an illustrative embodiment of the disclosed subject matter. Payment network 100 can allow for payment transactions in which merchants and card issuers do not necessarily have a one-to-one relationship. Payment network 100, for example may be a credit card payment system that utilizes an electronic payment network 140, such as the MasterCard® payment card system interchange network (MasterCard is a registered trademark of MasterCard International Incorporated located in Purchase, N.Y.).

As embodied herein, payment network 100 for collecting funds can include at least one merchant 110 connected to at least one electronic payment network 140, either directly or through an acquirer 120 via connection 115. At least one acquirer 120 can be connected to electronic network 140, and each merchant 110 can be in communication with at least one acquirer 120 via the at least one payment network 140 or connection 115. At least one issuer 130 can be connected to electronic network 140, and each acquirer 120 can be in communication with at least one issuer 130 via the electronic payment network 140.

For purpose of illustration, in payment network 100, a financial institution, such as an issuer 130, can issue an account, such as a credit card account or a debit card account, to a cardholder (e.g., an individual consumer or a corporate or commercial consumer), who can use the payment account card to tender payment for a purchase from a merchant 110 or to conduct a transaction at an ATM or through an internet website. To accept payment with the payment account card, merchant 110 can establish an account with a financial institution that is part of the financial payment system. This financial institution can be referred to as the "merchant bank" or the "acquiring bank," or herein as "acquirer 120."

When a cardholder tenders payment for a purchase with a payment account card, the merchant, ATM, or website 110 can request authorization from acquirer 120 for the amount of the purchase. The request can be performed over the telephone, online via a website, or through the use of a POS terminal which can read the cardholder's account information from the magnetic strip on the payment account card, from a smart card using contact pads, or contactlessly from a near-field communication (NFC) device, and communicate electronically with the transaction processing computers of acquirer 120. Alternatively, acquirer 120 can authorize a third party to perform transaction processing on its behalf In this case, the POS terminal can be configured to communicate with the third party. Such a third party can be referred to as a "merchant processor" or an "acquiring processor."

As embodied herein, using payment network 140, the computers of acquirer 120 or the merchant processor can communicate information regarding payment card transactions with computers of the issuer 130. For example, information regarding payment card transactions can include an authorization request 125 and an authorization response 135. An authorization request 125 can be communicated from the computers of the acquirer 120 to the computers of issuer 130 to determine whether the cardholder's account is in good standing and whether the purchase is covered by the cardholder's available credit line or account balance. Based on these determinations, authorization request 125 can be declined or accepted, and an authorization response 135 can be transmitted from issuer 130 to acquirer 120, and then to the merchant, ATM, or website 110. The authorization request 125 can include account information identifying the merchant, location information (e.g., an address of the merchant), and transaction information, as discussed herein. The authorization response 135 can include, among other things, a result of the determination that the transaction is approved or declined and/or information about the status of the payment card or payment account.

Figure 2:
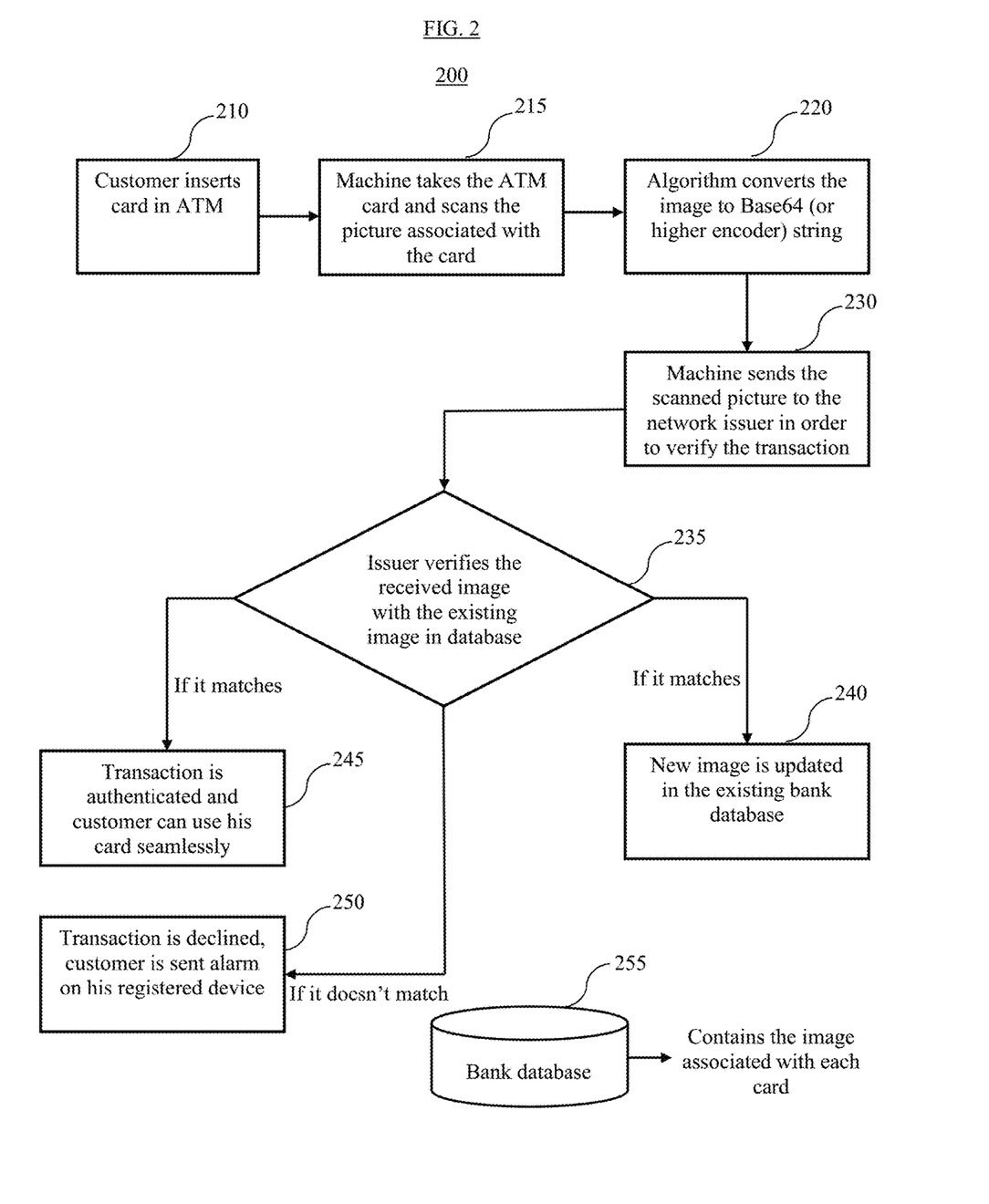
FIG. 2 is a flow diagram illustrating an exemplary process according to certain embodiments of the disclosed subject matter.

For example, at least one payment network server 150 can be connected to electronic payment network 140 and configured to automatically capture the data representing a plurality of variables related to payment card transactions from electronic payment network 140. Additionally, at least payment network server 150 or issuer 130 can perform process 200 as shown in FIG. 2. As discussed below, process 200 may provide for added fraud detection using at least one physical characteristics of the payment card. In some other embodiments, process 200 may be performed by a separate apparatus 160, which may, for example, be connected to electronic payment network 140 using a separate connection 155.

FIG. 2 is a flow diagram illustrating an exemplary process according to certain embodiments of the disclosed subject matter. As shown in FIG. 1, process 200 may be performed within electronic payment network 140, issuer 130, or in a separate apparatus 160 connected to either electronic payment network 140 or issuer 130. In particular, process 200 can leverage the existing physical characteristics of a payment card for fraud detection.

Payment cards experience regular wear and tear based on everyday use and storage. This wear and tear may be manifested as physical characteristics or embellishments, also referred to herein as physical condition, on the payment card, such as a smudge, scratch, stain, mark, blotch. The physical condition on a payment card can be detected and used by process 200 to prevent payment card fraud. The physical condition detected by process 200 may be any kind of physical change that alters the credit card from its original form.

For example, a user of a credit card may have scratched the center of a payment card with a key, creating a noticeable scratch in the credit card. In some embodiments, process 200 may detect and store an image of the scratched credit card. If another user attempts to use a fake or duplicate credit card, an image of the fake or duplicate credit card can be captured, and compared to the stored image of the user's scratched credit card. Process 200 may detect that such the fake or duplicate credit card does not have the same scratch, and can decline the transaction.

FIG. 2 illustrates a detailed example of process 200 being used to either authorize or deny a requested transaction. Even if the card has not experienced any wear and tear due to usage or storage, wear and tear may be artificially induced. In certain embodiments, the credit card may be dosed or covered with a chemical that will inflict wear and tear on the card. The chemical, for example, may be a natural isotope that degrades when exposed to oxygen. The natural isotope may have with a half-life that will begin to naturally decay as soon the card is issued to a customer. The decay of the isotope may cause wear and tear to the payment card, which can be captured by an image, a scanner, or any other sensor.

In step 210, a customer can insert a payment card, such as a credit card or a debit card, in an ATM. In other embodiments, instead of an ATM a POS terminal may be used in step 210. An image capturing device that communicates with the network, which may be included in the ATM or POS terminal, as shown in step 220, may then capture an image of the card. In some embodiments, the image capturing device may be captured using a camera or a scanner. The image may range from a low-resolution image, such as a 72 pixels per inch (PPI), to a high-resolution image, such as 300 PPI. While in certain embodiments an image of the entire card may be captured, in other embodiments one or more parts of the card may be captured. For example, a part of the card may include a magnetic strip, chip, card number, expiration date, CVV, hologram, and/or logo of an issuer. In yet another embodiment, any other part of the card may be captured, including a front side, back side, or on any edge of the card.

The physical condition of the part of the payment card shown in the received image may then be compared to the physical condition of the part of the payment card shown in a previously stored image. For example, a scratch or smudge on the card number, CVV, or hologram may be compared to the physical condition of the card number, CVV, or hologram in a previously stored image.

The camera can be placed on any part of the ATM that will allow for the proper capturing of an image of the card. In certain embodiments, one or more cameras or scanners may be placed inside the ATM to capture the image once the card is inserted into the ATM. In other embodiments, one or more cameras may be placed on an outside surface of the ATM or in a location that is separate from the ATM, such as the room in which the ATM is located. The image taken in step 215 may then be associated with the card.

In some other embodiments, instead of an ATM being used to capture an image of the card, a POS terminal may be used. Whenever the card is scanned through or inserted into the POS terminal, an image of at least a part of the card may be captured. In some embodiments, the POS terminal may include a camera, a scanner, or any other sensor that can enable the POS terminal to capture an image or scan any part of the card. For example, if a user inserts a card inside a chip reader on a POS terminal, the POS terminal may scan the inserted chip, as well as any other part of the card. In another example, if a user swipes a card through a magnetic strip scanner in a POS terminal, the POS terminal may capture an image of the magnetic strip of the card, as well as any other part of the card that can be swiped through the scanner.

After the image of at least one part of the card is captured, it may be stored in a temporary memory of the device or apparatus that captured the image. The stored images may then be encoded using an encoding algorithm, as shown in step 220. For example, the encoding algorithm may be a Base64 or a JPEG compression. In other embodiments, any other method of encoding an image may be used.

For each card, one or more images may be captured and stored. The images may be directed to different parts of the payment card. For example, one image may show the card chip, while another image may only show the magnetic strip of the card. The one or more images may also have differing pixel quality or image resolution. For example, one image may be stored as a low-resolution image, such as 72 PPI, while another image may be stored as a high-resolution image, such as 300 PPI. Storing images of differing display resolution may allow for verification of images having different resolutions. In certain embodiments, an ATM may capture a high definition image of a card. The high definition image may be compared to a stored high definition image, while a low-resolution image may be compared to a stored low-resolution image.

In step 230, the ATM or the POS terminal may send the encoded captured or scanned image to the network issuer to verify the transaction. Once the captured image of the part of the credit card is received, the network issuer may decode the image using any known decoding method. The issuer may verify the received image with the existing or stored image in the database, as shown in step 235. In other words, the physical condition of the part of the card shown in the captured image may be compared to the physical condition of the part of the card shown in a stored image. Any known image matching method, such as shape matching, pattern matching, and/or feature-based registration, may be used to compare the physical condition of the captured image and the stored image.

Shape matching, for example, may include determining and comparing a shape representation in the captured and stored images. To determine the shape, the matching may use a region-based representation, a quad tree representation, an edge-based representation, or a Fourier descriptor. Pattern matching, on the other hand, may include finding a pattern and/or correlation in an image, while the feature-based registration involves detecting various features and/or objects in an image and comparing those detected objects. Any other known image matching algorithm may be used, such as scale invariant feature transform (SIFT), speed up robust feature (SURF), or binary robust independent elementary features (BRIEF).

In step 240, if the physical condition of the part of the payment card shown in the captured or received image matches the physical condition of the part of the payment card shown in the stored image, the received image may be uploaded and stored to the existing bank database. In other words, the received image may either replace a currently stored image or be stored as an additional image in the database. The newly stored received image may be referred to as a new image. The received image may not replace the stored image after every transaction. In some embodiments, the received image may replace the stored image after a predetermined time period or a number of approved transactions. In yet another embodiment, the received image may replace the stored image if the received image differs from the stored image. In this way the stored image is updated to capture the current wear and tear or physical condition of the payment card. A matching threshold may be used to determine whether the stored image and the received image sufficiently differ. The matching threshold, described below, may be higher than the matching threshold used to authenticate the transaction. For example, if the matching threshold for authorizing a transaction can be 75%, the matching threshold for replacing the saved image may be 90%.

In some embodiments, bank database 255 may be located on one or more servers owned by the bank or institution issuing the card. In other embodiments, however, bank database 255 may be located in a cloud server or in another remote server that may not be owned by the bank or institution.

In certain embodiments, the transaction may be either authenticated or declined based on the comparison of the received image and the stored image, as shown in steps 245 and 250. The transaction may be authenticated, in step 245, when the physical condition of the part of the payment card shown in the received image matches the physical condition of the part of the payment card shown in a previously stored image by a predetermined threshold. In other words, when the predetermined threshold of the physical condition of a given part of the payment card shown in the received and stored images is met, the transaction may be approved.

The threshold, in some embodiments, may be preset. For example, the threshold may be present at a 75% match level, or any other match level. In other embodiments, however, the threshold may be dynamic, and may either increase or decrease depending on the use of an additional fraud prevention tool, the quality of the picture, and/or the type of transaction. In one example embodiment, a transaction involving a large sum of money may require a higher threshold. The large sum of money, for example, may be $500, $1000, or any other sum. In another example embodiment, if another fraud prevention tool is used along with the transaction the matching threshold may be decreased. For example, if a customer enters a PIN at a POS terminal or an ATM, the matching threshold may be decreased. In yet another example embodiment, the dynamic threshold may be increased or decreased depending on the quality of the picture. A high resolution picture, for example, may have a higher threshold than a lower resolution picture.

As discussed above, as shown in step 245, when the physical condition of the payment card shown in the received image matches the physical condition of the payment card shown in a previously stored image of the credit card by a threshold, the transaction can be approved. Once approved, the customer can use his card seamlessly, without experiencing any noticeable delay in the transaction. In step 250, when the physical condition of the payment card shown in a received image differs from the physical condition of the payment card shown in a previously stored image by a predetermined threshold, the transaction may be declined. Once declined, a customer may be sent an alarm informing the customer that the transaction has been declined. The alarm may be sent to either a registered device and/or an electronic mail address.

The alarm, in some embodiments, may alert a customer that his or her payment card has been declined and may be the subject of a potentially fraudulent transaction. In some embodiments, the alert may provide the location in which the attempted transaction was performed, and ask the client to confirm whether the transaction was attempted by the customer. If not, the customer may press a link allowing the subject card to be cancelled, and a new card to be issued.

Upon the issuance of the new card, all of the stored images associated with the card in the bank database 255 may be deleted or removed. In certain embodiments, a customer may use a mobile application to capture the first image of the card to be stored on bank database 255. For example, when a customer uses a mobile application to activate a payment card, the customer may be asked to capture an image of the front and/or back of the card using a smartphone camera. This first image may be stored in the database and used for the initial comparison. In other embodiments, the first image of the card may be captured by an image capturing device included in a ATM or a POS terminal, and which communicated with the payment network. In such embodiments, process 200 may not be used until after the first transaction by the payment card.

Figure 3:
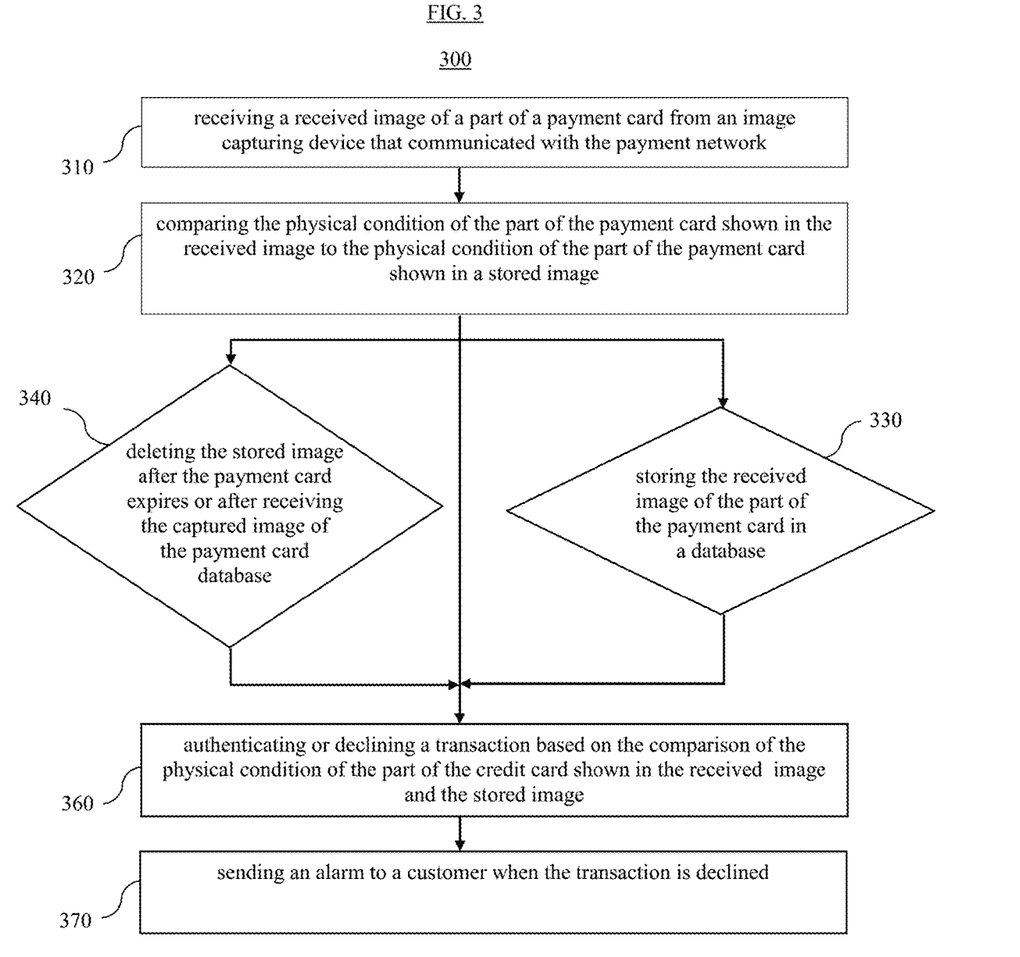
FIG. 3 is a flow diagram illustrating an exemplary method according to certain embodiments of the disclosed subject matter.

FIG. 3 is a flow diagram illustrating an exemplary method or process according to certain embodiments of the disclosed subject matter. The method or process may be performed by a payment network, and may be computer-implemented. In step 310, an image of a part of a payment card may be received from an image capturing device that communicates with the payment network. The image capturing device may be included in an ATM or a POS terminal. The image capturing device in the ATM or POS terminal may use at least one of a camera or a scanner to capture the image. In certain embodiments, the received image has been encoded using a coding algorithm. For example, the coding algorithm may be a Base64 or a JPEG.

In step 320, the physical condition of the part of the payment card shown in the received image may be compared to the physical condition of the part of the payment card shown in a stored image. In step 330, the received image of the part of the card may be stored in a database. The part of the credit card, for example, may be at least one of a magnetic strip, chip, card number, expiration date, card verification value, hologram, and/or logo of an issuer. In step 340, the stored image may be deleted after the payment card expires or after receiving the captured image. In other words, in some embodiments the received image may replace a previously stored image of the payment card.

In step 350, the transaction may be authenticated or declined based on the comparison of the physical condition of the part of the payment card shown in the received image and the physical condition of the part of the payment card shown in a stored image. The transaction may be authenticated or approved when the physical condition of the part of the payment card shown in the received image matches the physical condition of the part of the payment card shown in the stored image by a threshold. On the other hand, the transaction may be declined when the physical condition of the part of the payment card shown in the received image differs by a threshold from the stored image. After the transaction is declined, an alarm may be sent to the user. In some embodiments, the threshold may be a predetermined threshold value or a dynamic threshold value. The predetermined threshold value can be 75%, or any other value. As discussed above, the dynamic threshold value may be decreased when an additional fraud prevention tool is used. The additional fraud prevention tool, for example, may be the use of a personal identification number (PIN).

Figure 4:
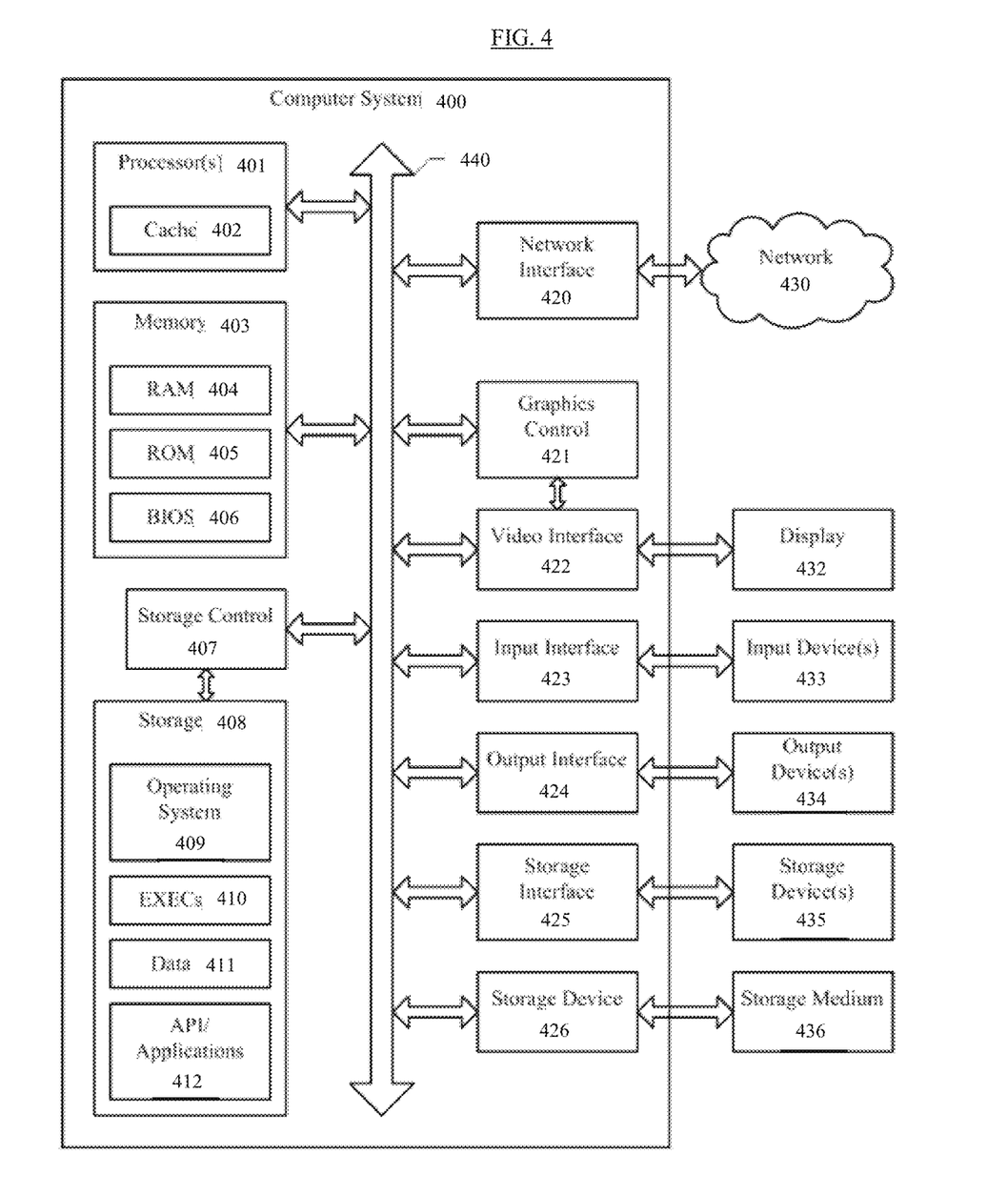
FIG. 4 is a block diagram illustrating further details of a representative apparatus according to an illustrative embodiment of the disclosed subject matter.

FIG. 4 is a block diagram illustrating further details of a representative apparatus according to an illustrative embodiment of the disclosed subject matter. The systems and techniques discussed herein can be implemented in a computer system. As an example and not by limitation, as shown in FIG. 4, the computer system having architecture 400 can provide functionality as a result of processor(s) 401 executing software embodied in one or more tangible, non-transitory computer-readable media, such as memory 403. The software implementing various embodiments of the present disclosure can be stored in memory 403 and executed by processor(s) 401. A computer-readable medium can include one or more memory devices, according to particular needs. Memory 403 can read the software from one or more other computer-readable media, such as mass storage device(s) 435 or from one or more other sources via communication interface 420. The software can cause processor(s) 401 to execute particular processes or particular parts of particular processes described herein, including defining data structures stored in memory 403 and modifying such data structures according to the processes defined by the software.

An exemplary input device 433 can be, for example, a keyboard, a pointing device (e.g. a mouse), a touchscreen display, a microphone and voice control interface, a pressure sensor or the like to capture user input coupled to input interface 423 to provide data and/or user input to processor 401. Input device 433 may be an ATM or POS terminal. An exemplary output device 434 can be, for example, a display (e.g. a monitor) or speakers or a haptic device coupled to output interface 424 to allow processor 401 to present a user interface, visual content, and/or audio content. Additionally or alternatively, computer system 400 can provide an indication to the user by sending text or graphical data to a display 432 coupled to a video interface 422. Furthermore, any of the above components can provide data to or receive data from processor 401 via a computer network 430 coupled to communication interface 420 of computer system 400.

In addition to or as an alternative, the computer system can provide functionality as a result of logic hardwired or otherwise embodied in a circuit, which can operate in place of or together with software to execute particular processes or particular parts of particular processes described herein. Reference to software or executable instructions can encompass logic, and vice versa, where appropriate. Reference to a computer-readable media can encompass a circuit (such as an integrated circuit (IC)) storing software or executable instructions for execution, a circuit embodying logic for execution, or both, where appropriate. The present disclosure encompasses any suitable combination of hardware and software.

Processor 401, for example, can be embodied by any computational or data processing device, such as a central processing unit (CPU), digital signal processor (DSP), application specific integrated circuit (ASIC), programmable logic devices (PLDs), field programmable gate arrays (FPGAs), input/output (I/O) circuitry, digitally enhanced circuits, or comparable device, or any combination thereof.

In some embodiments, processor 401 includes hardware for executing instructions, such as those making up a computer program. As an example, and not by way of limitation, to execute instructions, processor 401 can retrieve (or fetch) the instructions from an internal register, an internal cache 402, memory 403, or storage 408, decode and execute them, and then write one or more results to an internal register, an internal cache 402, memory 403, or storage 408. In certain embodiments, processor 401 can include one or more internal caches 402 for data, instructions, or addresses. This disclosure contemplates processor 401 including any suitable number of any suitable internal caches, where appropriate. As an example and not by way of limitation, processor 401 can include one or more instruction caches 402, one or more data caches 402, and one or more translation lookaside buffers (TLBs).

Instructions in the instruction caches 402 can be copies of instructions in memory 403 or storage 408, and the instruction caches 402 can speed up retrieval of those instructions by processor 401. Data in the data caches 402 can be copies of data in memory 403 or storage 408 for instructions executing at processor 401 to operate on, the results of previous instructions executed at processor 401 for access by subsequent instructions executing at processor 401 or for writing to memory 403 or storage 408, or any other suitable data. Data caches 402 can speed up read or write operations by processor 401. The TLBs can speed up virtual-address translation for processor 401. In some embodiments, processor 401 can include one or more internal registers for data, instructions, or addresses. This disclosure contemplates processor 401 including any suitable number of any suitable internal registers, where appropriate. Where appropriate, processor 401 can include one or more arithmetic logic units (ALUs), may be a multi-core processor, or include one or more processors 401. Although this disclosure describes and illustrates a particular processor, this disclosure contemplates any suitable processor.

In some embodiments, memory 403 includes main memory for storing instructions for processor 401 to execute or data for processor 401 to operate on. As an example and not by way of limitation, computer system 400 can load instructions from storage 408 or another source (such as, for example, another computer system 400) to memory 403. Processor 401 can then load the instructions from memory 403 to an internal register or internal cache 402. To execute the instructions, processor 401 can retrieve the instructions from the internal register or internal cache 402 and decode them. During or after execution of the instructions, processor 401 can write one or more results (which can be intermediate or final results) to the internal register or internal cache 402. Processor 401 can then write one or more of those results to memory 403. In some embodiments, processor 401 may execute only instructions in one or more internal registers or internal caches 402 or in memory 403 (as opposed to storage 408 or elsewhere) and operates only on data in one or more internal registers or internal caches or in memory 403 (as opposed to storage 408 or elsewhere). Memory 403 can independently be any suitable storage device, such as a non-transitory computer-readable medium, a hard disk drive (HDD), random access memory (RAM), flash memory, or other suitable memory.

One or more memory buses (which can each include an address bus and a data bus) can couple processor 401 to memory 403. Bus 440 can include one or more memory buses, as described below. In some embodiments, one or more memory management units (MMUs) reside between processor 401 and memory 403, and may help to facilitate accesses to memory 403 requested by processor 401. In some embodiments, memory 403 includes RAM. This RAM can be volatile memory, where appropriate. Where appropriate, this RAM can be dynamic RAM (DRAM) or static RAM (SRAM). Moreover, where appropriate, this RAM can be single-ported or multi-ported RAM. This disclosure contemplates any suitable RAM. Memory 403 can include one or more memories 404, where appropriate. Although this disclosure describes and illustrates particular memory, this disclosure contemplates any suitable memory.

In some embodiments, storage 408 includes mass storage for data or instructions. As an example and not by way of limitation, storage 408 can include a hard disk drive (HDD), a floppy disk drive, flash memory, an optical disc, a magneto-optical disc, magnetic tape, or a Universal Serial Bus (USB) drive or a combination of two or more of these.

Storage 408 can include removable or non-removable (or fixed) media, where appropriate. Storage 408 can be internal or external to computer system 400, where appropriate. In some embodiments, storage 408 is non-volatile, solid-state memory. In some embodiments, storage 408 includes read-only memory (ROM). Where appropriate, this ROM can be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 408 taking any suitable physical form. Storage 408 can include one or more storage control units facilitating communication between processor 401 and storage 408, where appropriate. Where appropriate, storage 408 can include one or more storages 408. Although this disclosure describes and illustrates particular storage, this disclosure contemplates any suitable storage.

In some embodiments, input interface 423 and output interface 424 can include hardware, software, or both, providing one or more interfaces for communication between computer system 400 and one or more input device(s) 433 and/or output device(s) 434. Computer system 400 can include one or more of these input device(s) 433 and/or output device(s) 434, where appropriate. One or more of these input device(s) 433 and/or output device(s) 434 can enable communication between a person and computer system 400. As an example and not by way of limitation, an input device 433 and/or output device 434 can include a keyboard, keypad, microphone, monitor, mouse, printer, scanner, speaker, still camera, stylus, tablet, touch screen, trackball, video camera, another suitable input device 433 and/or output device 434 or a combination of two or more of these. An input device 433 and/or output device 434 can include one or more sensors. This disclosure contemplates any suitable input device(s) 433 and/or output device(s) 434 and any suitable input interface 423 and output interface 424 for them. Where appropriate, input interface 423 and output interface 424 can include one or more device or software drivers enabling processor 401 to drive one or more of these input device(s) 433 and/or output device(s) 434. Input interface 423 and output interface 424 can include one or more input interfaces 423 or output interfaces 424, where appropriate. Although this disclosure describes and illustrates a particular input interface 423 and output interface 424, this disclosure contemplates any suitable input interface 423 and output interface 424.

As embodied herein, communication interface 420 can include hardware, software, or both providing one or more interfaces for communication (such as, for example, packet-based communication) between computer system 400 and one or more other computer systems 400 or one or more networks. As an example and not by way of limitation, communication interface 420 can include a network interface controller (NIC) or network adapter for communicating with an Ethernet or other wire-based network or a wireless NIC (WNIC) or wireless adapter for communicating with a wireless network, such as a wireless local area network (WLAN). This disclosure contemplates any suitable network and any suitable communication interface 420 for it. As an example and not by way of limitation, computer system 400 can communicate with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless.

As an example, computer system 400 can communicate with a wireless PAN (WPAN) (such as, for example, a BLUETOOTH WPAN), a WLAN network, a WI-MAX network, a cellular telephone network, such as a Global System for Mobile Communications (GSM) network, Long Term Evolution (LTE), LTE-Advanced, 3G/4G/5G, or other suitable wireless network or a combination of two or more of these. Computer system 400 can include any suitable communication interface 420 for any of these networks, where appropriate. Communication interface 420 can include one or more communication interfaces 420, where appropriate. Although this disclosure describes and illustrates a particular communication interface, this disclosure contemplates any suitable communication interface.

In some embodiments, bus 440 includes hardware, software, or both coupling components of computer system 400 to each other. As an example and not by way of limitation, bus 440 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 440 can include one or more buses 404, where appropriate. Although this disclosure describes and illustrates a particular bus, this disclosure contemplates any suitable bus or interconnect.

Herein, a computer-readable non-transitory storage medium or media can include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium can be volatile, non-volatile, or a combination of volatile and non-volatile, where appropriate.

In certain embodiments, a non-transitory computer-readable medium can be encoded with computer instructions or one or more computer programs (such as added or updated software routine, applet or macro) that, when executed in hardware, can perform a process such as one of the processes described herein. Computer programs can be coded by a programming language, which can be a high-level programming language, such as objective-C, C, C++, C#, Java, etc., or a low-level programming language, such as a machine language, or assembler. Alternatively, certain embodiments can be performed entirely in hardware.

As discussed above, certain embodiments may utilize the physical condition of the mobile device to verify or authenticate payments involving digital card data stored within the mobile device. While hackers can fraudulently obtain digital card data, as well as use phishing applications to obtain one-time passwords and/or an IMEI, it may be difficult to replicate the physical condition of the mobile device or phone. Specifically, the physical condition of the mobile device or phone, such as, for example, its scratches, smudges, dents, or corrosion, can be unique to the mobile device based on customer usage. It can therefore be difficult for malicious actors to replicate the physical condition of the mobile device.

The physical condition of the mobile device is dynamic, meaning that physical condition changes over time. Even if a hacker can manage to replicate the physical condition on the device at a given point in time, given the dynamic nature of the physical condition the replication will not accurately reflect the physical condition of the mobile device at a point in time thereafter. Using the physical condition of the mobile device to verify or authenticate a transaction can therefore be an effective tool to prevent fraudulent transactions.

Figure 5:
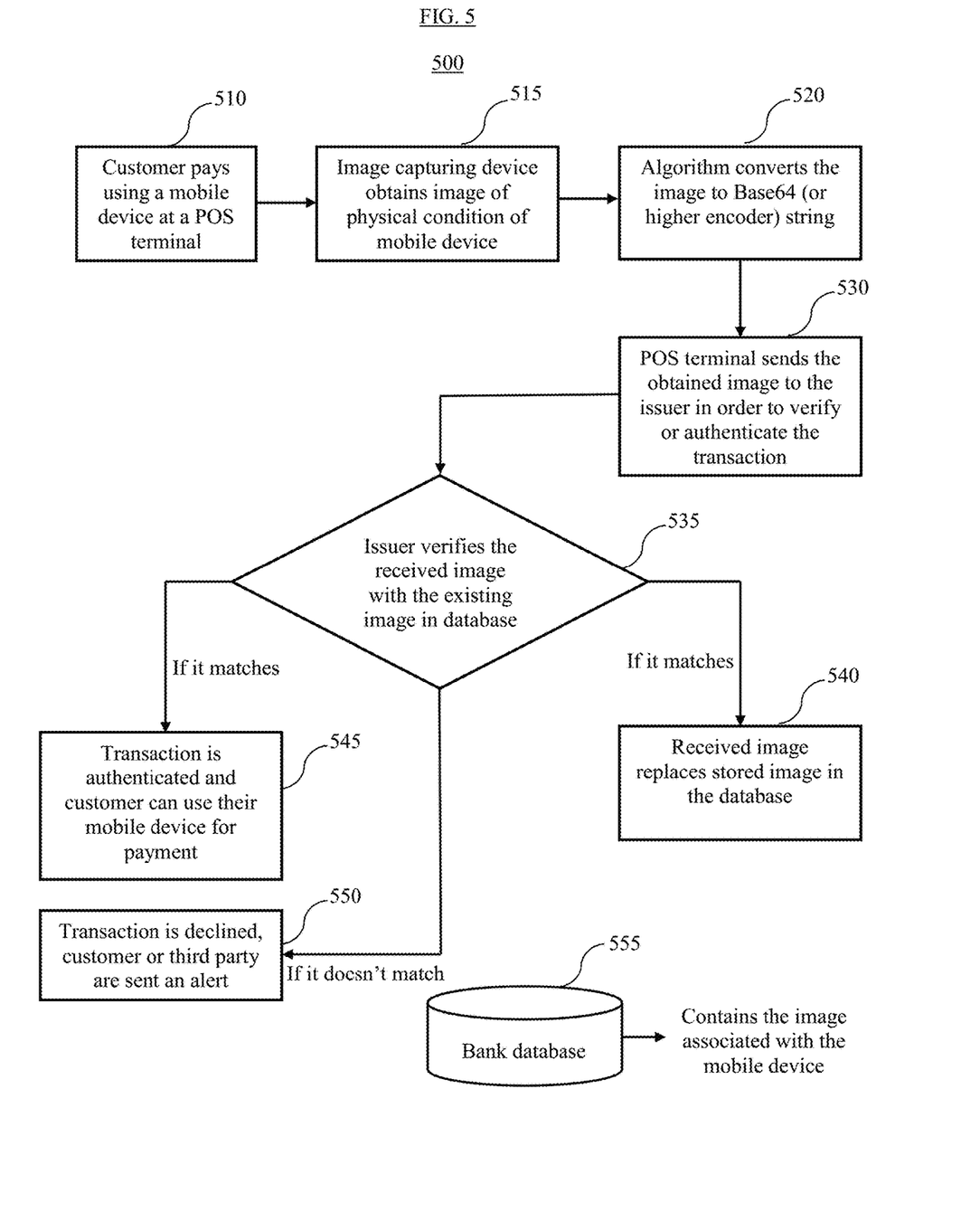
FIG. 5 is a flow diagram illustrating an exemplary process according to certain embodiments of the disclosed subject matter.

FIG. 5 illustrates a detailed example of process 500 being used to either authorize or deny a requested transaction based on the physical condition of a mobile device or phone. The mobile device can include processor 401, memory 403, storage control 407, storage 408, input/output interfaces 423, 424, display 432, and/or any other component illustrated in FIG. 4 and described above. In certain embodiments, some or all of the features discussed above for authorizing a transaction based on the physical condition of a payment card can be used to authorize a transaction using the physical condition of the mobile device.

In step 510, a customer can initiate a transaction by attempting to pay at a POS terminal using a mobile device that includes digital card data. While attempting to pay an image of the mobile device can be captured or obtained, in step 515. For example, the image of the mobile device can be captured using any image sensing device, including a camera, a scanner, or any other device. The image can capture any available physical condition of the mobile device or phone, even if the physical conditions is not visible to the human eye. The image can include a physical condition of one or more surfaces of the mobile device. In certain embodiments the image can capture the physical condition of the whole surface or a portion of the one or more surfaces.

In step 520, the captured image can be encoded using an encoding algorithm. The encoding algorithm, for example, may be a JPEG compression, a Base64 compression, or a higher encoder. In other embodiments, any other method of encoding an image may be used. In step 530, the POS terminal may send the obtained image to a processor or server at the payment network. The processor or server may decode the image using any available method. Once decoded, the payment network can verify or authenticate the received image of the mobile device by comparing the image with an existing or stored image of the mobile device in a database 555, as shown in step 535. In other words, the physical condition of the mobile device in the received image can be compared to the physical condition of the mobile device in a stored image. Any known image matching method, such as shape matching, pattern matching, and/or feature-based registration, may be used to compare the physical condition of the captured and stored images.

In one non-limiting example, any scratches, warping, lines, or any other physical condition of the mobile device shown in the received image can be compared to any scratches, warping, lines, or physical condition shown in the stored image. If the physical condition of the received and stored images match, the transaction can be authenticated and the mobile device can be used for payment, as shown in step 545. Further, if the physical condition of the received and stored images match, the received image can replace the stored image in the database, as shown in step 540. On the other hand, if the received and stored images do not match, the transaction can be declined, at which point the customer or a third party can be sent an alert, as shown in step 550.

For proper verification of the transaction in step 535, a stored image can be used. The first or initial image of the mobile device stored in the database can be obtained during the first transaction using the mobile device. This first or initial stored image can be used as a baseline image to which one or more subsequent received images can be compared. In yet another example, the first or initial image stored in the database can be obtained using a mobile application. The mobile application, for example, can request that the user or customer capture an image of the mobile device that holds the digital card data. After one or more transactions, a new received image of the mobile device can be captured and transmitted to the database. The received image can be stored in the database, and in some embodiments replace the stored image.

The received image can be captured by the POS terminal. The POS terminal can include a camera, a scanner, or any other sensor that can allow the POS terminal to capture an image or scan any part, surface, or edge of the mobile device. In an example, the front and back surfaces of the mobile device can be captured. In particular, when paying with a mobile device the POS terminal can capture an image of the back surface of the mobile device when the customer places the mobile device near the POS terminal to initiate the payment. The customer can then be asked to manually flip the mobile device to allow an image capturing device in the POS to capture an image of both the front and back surfaces. In another embodiment, the mobile device can be placed on a plate connected to the POS terminal. The plate can be designed to initiate payment using the mobile device, while also capturing images of both the front and back surfaces of the mobile device.

The mobile device used by a user or consumer may be covered by a casing or a wallpaper. Before the image of the mobile device may be captured the user or consumer can be asked to remove the wallpaper or casing. Alternatively, an image of any exposed surface of the mobile device not covered by the casing or wallpaper can be captured. In yet another embodiment, the physical condition of the mobile device can include the casing, wallpaper, or cover of the mobile device.

In certain embodiments the digital card data can be stored in multiple mobile devices. Each customer can have N number of phones associated with the digital card data. In such embodiments a single user or consumer can use the same digital card data in multiple mobile devices. To account for the multiple mobile devices, the POS terminal can transfer the encoded image of the mobile device with its IMEI. The IMEI can be encoded and transmitted either separately or along with the captured image. The payment network can use the IMEI associated with the image of the mobile device to track the customer of the digital card data. Each mobile device can be identified with a unique IMEI, which the payment network can use to track the multiple mobile devices associated with the digital card data of the customer. For example, if an unauthorized mobile device attempts to initiate a payment with the digital card data, an unfamiliar IMEI can be flagged and the transaction declined. The flagged IMEI can be stored and transmitted to a third party, such as a policing authority or another credit monitoring agency. In certain embodiments a mobile device can be pre-registered with the payment network, allowing the payment network to identify authorized IMEIs belonging to the user or the consumer.

When verifying the received image with the stored image, the payment network can use a threshold, also referred to as a match threshold, to determine the difference between the received and stored images. If the difference is greater than the match threshold, the transaction can be authenticated. If the difference is lower than the match threshold, the transaction can be denied. In one non-limiting example the match threshold can be 85%. The threshold match percentage can be dynamic, and can depend on the quality of the image and/or whether an additional layer of authentication or fraud prevention tool is used. When an additional layer of authentication is used, a lower match threshold can be used. The additional layer of authentication can be, for example, using an IMEI or a one-time password.

In one non-limiting example, the front surface of the mobile device, which generally contains the screen of the mobile device, can shatter. If the shattered screen is included in the received image, the difference between the received image and the stored image can be much less than the match threshold. In such an example, the payment network can isolate and/or detect any physical conditions that lay within the shattered screen and compare those. Further, in another example the payment network can ignore the shattered front surface, and instead rely on the back surface, side surfaces, or edges of the mobile device.

In some embodiments, if the difference between the received and stored images is less than the match threshold because of shattering, an alert can be sent to the customer to confirm that the front surface of the mobile device has been shattered. The payment network can wait for a confirmation from the customer before authorizing the transaction. The above examples regarding the shattered screen can be applicable to any other change in the mobile sides or surfaces that lead the comparison of the received and stored images to be below the match threshold.

The example embodiments described above can help to prevent hackers from using stolen digital card data to make payments by leveraging the physical condition of the mobile device as an additional layer of protection. When a given transaction is declined, an alert may be transmitted to a customer. The alert may notify the user or customer that their digital card data has been hacked or stolen. As part of the alert, the payment network can request that the customer call the issuer and cancel his payment card. In yet another embodiment, upon declining a transaction the payment network can proceed to cancel the payment card without seeking any action from the customer. When alerting the customer of the declined transaction, the payment network can also inform the customer that the payment card has been cancelled, meaning that the digital card data associated with the payment card can no longer be used to make payments. Upon cancellation of the payment card the bank can proceed to issue the customer a new payment card, without requiring that the customer call the bank and request the new card.

In some embodiments, an alert may be transmitted to a third party when the transaction is declined. The third party may be a policing authority or another agency responsible for monitoring and reviewing fraudulent credit payment activity. The alert transmitted to the third party can include the IMEI of the unauthorized mobile device that uses stolen digital card data. The IMEI can then be used to identify or capture the fraudulent mobile device offline, even after the transaction has been initiated and declined.

As discussed above, when initiating a payment with digital card data on a mobile device the POS terminal may take an image of the mobile device. The image can be a picture, video, or a scan of one or more parts or surfaces of the mobile device. After a video is captured, for example, the video can be encoded and transmitted to a server or processor that can be accessed by the issuer of the payment card associated with the digital card data. The video can then be decoded, and a frame to frame comparison with a previously stored video can be performed. In another embodiment, the video can be broken up into a plurality of frames, and one or more of the frames can be compared to a stored picture of the mobile device. One or more of the plurality of frames can be stored. Taking a video can be beneficial, in some embodiments, because it allows for the capturing of surfaces, edges, and/or parts of the mobile device that a photograph cannot capture.

Figure 6:
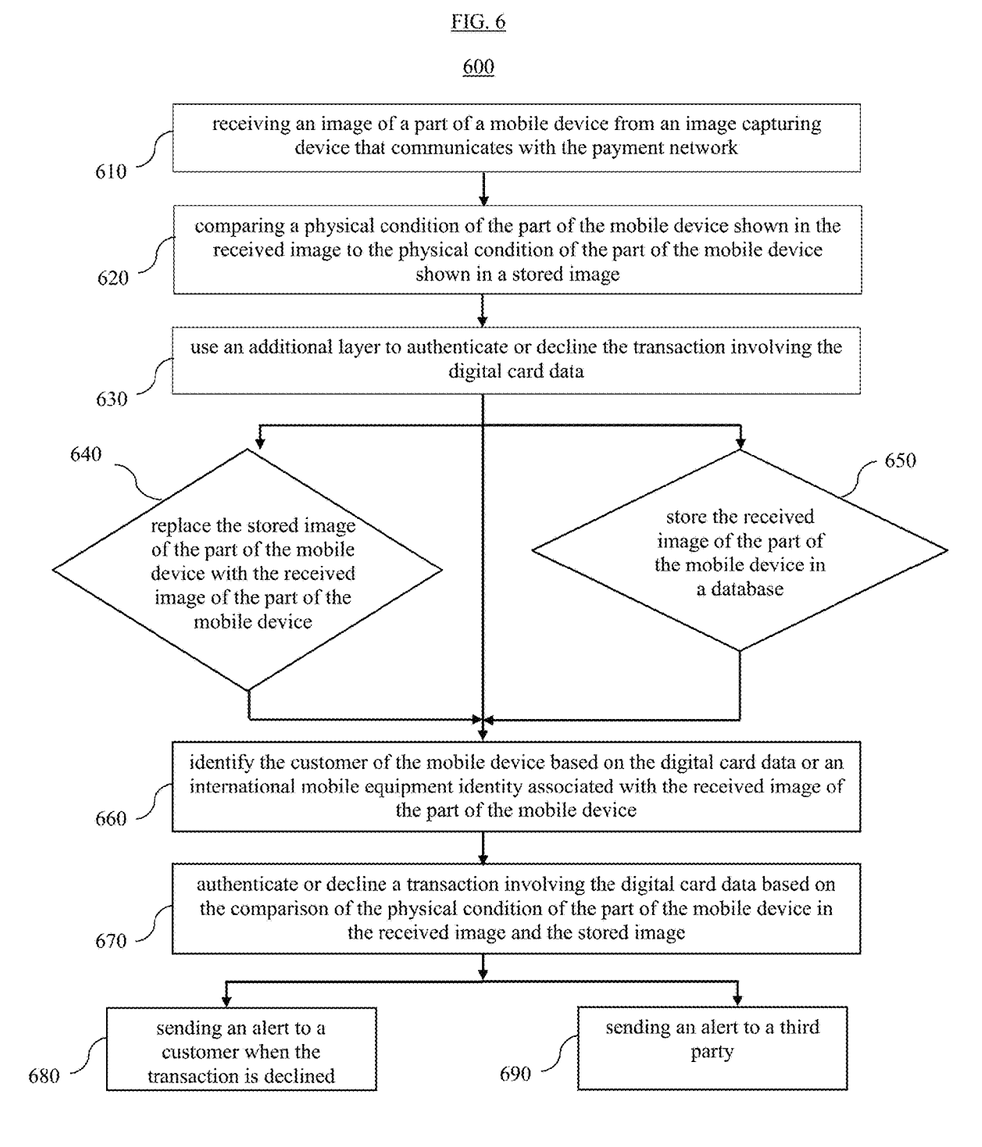
FIG. 6 is a flow diagram illustrating an exemplary method according to certain embodiments of the disclosed subject matter.

FIG. 6 is a flow diagram illustrating an exemplary method according to certain embodiments of the disclosed subject matter. In step 610, an image of a part of a mobile device can be received from an image capturing device that communicates with the payment network. The image capturing device, which can be a camera or a scanner, can be included in a POS terminal. The image can be encoded using a coding algorithm and transmitted from the POS terminal to a server or processor in the payment network. A physical condition of a part of the mobile device shown in the received image can then be compared to the physical condition of the part of the mobile device shown in the stored image, as shown in step 620. In some embodiments, the received image of the mobile device can illustrate an incremental change to the physical condition of the part of the mobile device shown in a stored image. The part of the mobile device can include at least one of a front, back, side, or edge of the mobile device of the mobile device.

When comparing the difference between the received image and the stored image, a threshold, also referred to as a match threshold, can be used. The threshold can have a predetermined value, such as 85%, or can be a dynamic threshold value. The dynamic threshold value can be decreased when an additional layer of authentication, also referred to as an additional fraud prevention tool, is used.

In step 630, an additional layer can be used to authenticate or decline the transaction involving the digital card data. For example, the additional layer can include using an IMEI or a one-time password to further authenticate a transaction involving the digital card data. In step 640, the stored image of the part of the mobile device can be replaced with the received image. In step 650, the received image of the part of the mobile device can be stored in a database.

The customer of the mobile device can be identified based on digital card data and/or the IMEI associated with the received image of the part of the mobile device, as shown in step 660. In step 670, the transaction involving the digital card data can be authenticated or declined based on the comparison of the physical condition of the part of the mobile device in the received image and the stored image. The transaction can be authenticated when the physical condition of the part of the mobile device shown in the received image matches the physical condition of the part of the mobile device shown in the stored image by a threshold. On the other hand, the transaction involving the digital card data can be declined when the physical condition of the part of the mobile device shown in the received image differs by a threshold from the physical condition of the part of the mobile device shown in the stored image.

In step 680, an alert can be sent to the customer or user when the transaction is declined. The customer or user to whom the payment card associated with the digital card data is issued can then choose to cancel the payment card. In other embodiments the payment card can be automatically cancelled once a transaction is declined. In addition to, or as an alternative, an alert can be sent to a third party, such as a policing authority or a credit monitoring agency, as shown in step 690. The alert can include the IMEI of the mobile device, which can allow the third party to identify the fraudulent mobile devices, even once they are offline. Offline can mean that the transaction has been declined and the customer of the fraudulent mobile device is no longer communicating with the POS.

The above embodiments provide significant technical improvements and advantages to credit and debit card processing systems. As discussed above, by allowing for a comparison of a physical condition of a part of a payment card or the mobile device shown in a received image to the physical condition of the part of a payment card shown in the stored image, fraudulent transactions can be detected and declined. Certain embodiments may also help to stop payment card fraud by using the physical condition of the card or mobile device. Preventing fraud can help to remove unnecessary processing involved with authenticating fraudulent transactions, or additional processing needed to cure a previously authenticated fraudulent transaction. The reduced processing can decrease the number of resources used by the network. Therefore, certain embodiments disclose subject matter that helps to significantly improve processing efficiency, while also helping to detect and prevent fraud.

The features, structures, or characteristics of certain embodiments described throughout this specification can be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment can be included in at least one embodiment of the disclosed subject matter. Thus, appearance of the phrases "in certain embodiments," "in some embodiments," "in other embodiments," or other similar language, throughout this specification does not necessarily refer to the same group of embodiments, and the described features, structures, or characteristics can be combined in any suitable manner in one or more embodiments.

One having ordinary skill in the art will readily understand that the disclosed subject matter as discussed above can be practiced with procedures in a different order, and/or with hardware elements in configurations which are different from those disclosed. Therefore, although the disclosed subject matter has been described based upon these embodiments, it would be apparent to those of skill in the art that certain modifications, variations, and alternative constructions would be apparent, while remaining within the spirit and scope of the disclosed subject matter.

The invention claimed is:

1. An apparatus in a payment network comprising:
at least one memory comprising computer program code; and
at least one processor;
wherein the computer program code is configured, when executed by the at least one processor, to cause the apparatus in the payment network to:
receive an image of a part of a mobile device comprising at least one surface or edge of the mobile device from an image capturing device that communicates with the payment network, wherein the mobile device includes digital card data of a customer, and wherein the received image is associated with an International Mobile Equipment Identity (IMEI) of the mobile device;
compare a physical condition of the part of the mobile device comprising wear and tear of the mobile device shown in the received image to the physical condition of the part of the mobile device shown in a stored image; and
authenticate or decline a transaction involving the digital card data based on the comparison of the physical condition of the part of the mobile device in the received image and the stored image.

2. The apparatus in the payment network according to claim 1, wherein the image capturing device is included in a point-of-sale (POS) terminal.

3. The apparatus in the payment network according to claim 1, wherein the computer program code is configured, when executed by the at least one processor, to cause the apparatus to:
use an additional layer of authentication to authenticate or decline the transaction involving the digital card data, wherein the additional layer of authentication comprises a one-time password or an international mobile equipment identity.

4. The apparatus in the payment network according to claim 1, wherein the received image illustrates an incremental change to the physical condition of the part of the mobile device compared to the part shown in the stored image.

5. The apparatus in the payment network according to claim 1, wherein the received image of the part of the mobile device has been encoded using a coding algorithm.

6. The apparatus in the payment network according to claim 1, wherein the computer program code is configured, when executed by the at least one processor, to cause the apparatus to:
store the received image of the part of the mobile device in a database.

7. The apparatus in the payment network according to claim 5, wherein the computer program code is configured, when executed by the at least one processor, to cause the apparatus to:
replace the stored image of the part of the mobile device with the received image of the part of the mobile device.

8. The apparatus in the payment network according to claim 1, wherein the computer program code is configured, when executed by the at least one processor, to cause the apparatus to:
identify the customer of the mobile device based on the digital card data or an international mobile equipment identity associated with the received image of the part of the mobile device.

9. The apparatus in the payment network according to claim 1, wherein the computer program code is configured, when executed by the at least one processor, to cause the apparatus to:
send an alert to the customer when the transaction is declined, wherein the alert informs the customer of fraudulent use of the digital card data.

10. The apparatus in the payment network according to claim 1, wherein the computer program code is configured, when executed by the at least one processor, to cause the apparatus to:
send another alert to a third party when the transaction is declined, wherein the another alert comprises an international mobile equipment identity of the mobile device.

11. The apparatus in the payment network according to claim 1, wherein the transaction involving the digital card data is declined when the physical condition of the part of the mobile device in the received image differs by a threshold from the physical condition of the part of the mobile device in the stored image.

12. The apparatus in the payment network according to claim 1, wherein the transaction is authenticated when the physical condition of the part of the mobile device in the received image matches the physical condition of the part of the mobile device in the stored image by a threshold.

13. The apparatus in the payment network according to claim 1, wherein the part of the mobile device comprises a front, a back, a side, or an edge of the mobile device.

14. The apparatus in the payment network according to claim 1, wherein the image capture device comprises at least one of a camera or a scanner.

15. A computer-implemented method performed by a payment network comprising:
   receiving an image of a part of a mobile device comprising at least one surface or edge of the mobile device from an image capturing device that communicates with the payment network, wherein the mobile device includes digital card data of a customer, and wherein the received image is associated with an International Mobile Equipment Identity (IMEI) of the mobile device;
   comparing a physical condition of the part of the mobile shown in the received image to the physical condition of the part of the mobile device shown in a stored image comprising wear and tear of the mobile device; and
   authenticating or declining a transaction involving the digital card data based on the comparison of the physical condition of the part of the mobile device in the received image and the stored image.

16. The computer-implemented method performed by the payment network according to claim 15, further comprising:
   using an additional layer to authenticate or decline the transaction involving the digital card data, wherein the additional layer comprises a one-time password or an international mobile equipment identity.

17. The computer-implemented method performed by the payment network according to claim 15, wherein the transaction involving the digital card data is declined when the physical condition of the part of the mobile device shown in the received image differs by a threshold from the physical condition of the part of the mobile device shown in the stored image.

18. The computer-implemented method performed by the payment network according to claim 15, wherein the transaction is authenticated when the physical condition of the part of the mobile device shown in the received image matches the physical condition of the part of the mobile device shown in the stored image by a threshold.

19. The computer-implemented method performed by the payment network according to claim 15, further comprising:
   replacing the stored image of the part of the mobile device with the received image of the part of the mobile device.

20. The computer-implemented method performed by the payment network according to claim 15, further comprising:
   sending an alert to the customer when the transaction is declined, wherein the alert informs the customer of fraudulent use of the digital card data.

* * * * *